Aug. 30, 1955 R. T. HURLEY 2,716,578
SPLIT CONNECTING ROD CONSTRUCTION
Filed Feb. 27, 1953
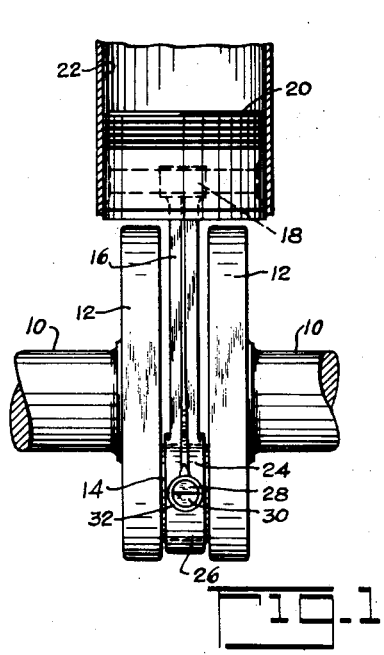
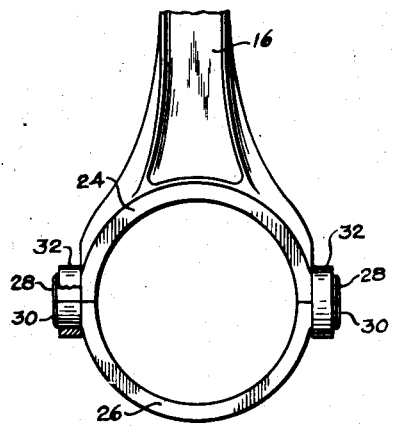
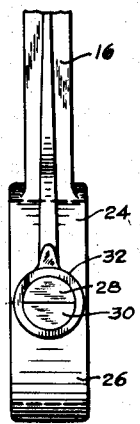
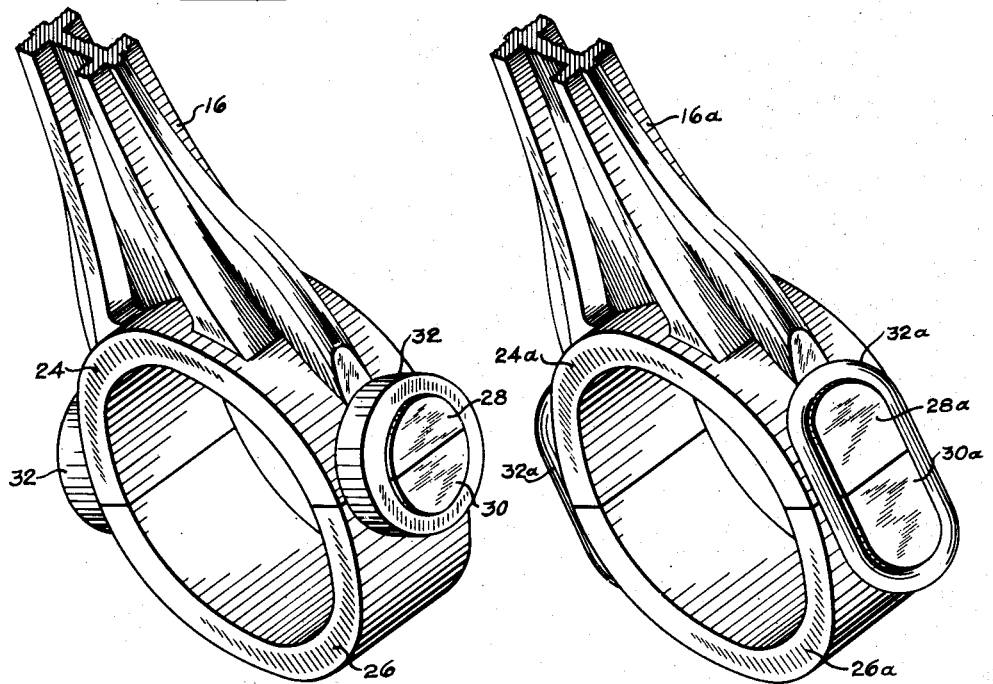
INVENTOR
ROY T. HURLEY
BY Victor D. Behn
ATTORNEY

United States Patent Office 2,716,578
Patented Aug. 30, 1955

2,716,578

SPLIT CONNECTING ROD CONSTRUCTION

Roy T. Hurley, Westport, Conn., assignor to Curtiss-Wright Corporation, a corporation of Delaware Application February 27, 1953, Serial No. 339,425

13 Claims. (Cl. 308—23)

This invention relates to split bearings and is particularly directed to connecting rods having split ends for pivotal connection about a crankshaft crankpin.

The crankpin end of a conventional automotive connecting rod comprises a semi-cylindrical bearing portion formed integral with the connecting rod shank and to which a semi-cylindrical bearing cap is secured by screws or bolts. An object of the present invention comprises the provision of a connecting rod having a relatively simple and economical means of tightly securing a connecting rod bearing cap to its connecting rod. In accordance with the invention each end of the semi-cylindrical bearing portion of a connecting rod and each end of the semi-cylindrical bearing cap of said connecting rod is provided with a projecting boss and a one piece ring is disposed in tension about the two bosses at each junction of the connecting rod bearing portion and bearing cap for securing the bearing cap in position.

Other objects of the invention will become apparent upon reading the annexed detailed description in connection with the drawing in which:

Fig. 1 is a schematic view of a crankshaft with a connecting rod embodying the invention;

Fig. 2 is an enlarged axial view of the crankshaft end of the connecting rod;

Fig. 3 is a side view of Fig. 2;

Fig. 4 is an enlarged perspective view of the crankshaft end of the connecting rod; and Fig. 5 is a view similar to Fig. 4 but illustrating a slightly modified construction.

Referring first to Fig. 1 of the drawing, a crankshaft 10 has a pair of crankcheeks 12 and a crankpin 14 is disposed between and is integral with said crankcheeks. A connecting rod 16 has one end pivotally connected about the crankpin 14. The other end of the connecting rod 16 is pivotally connected to a piston 20 slidable in a cylinder 22. By reason of the connection between the piston 20 and crankshaft 10 provided by the connecting rod 16, sliding motion of the piston is converted to rotary motion of the crankshaft or rotary motion of said crankshaft is converted to sliding motion of a piston depending on whether the driving force is supplied by the piston, as in the case of an internal combustion engine, or by the crankshaft, as in the case of a compressor. For convenience of description engine operation is assumed.

As best seen in Figs. 2–4, the crankpin end of the connecting rod 14 has a split-bearing construction and comprises a semi-cylindrical bearing portion 24 integral with the connecting rod shank and a semi-cylindrical bearing cap 26 is secured to said bearing portion. This split-bearing construction permits the connecting rod 14 to be pivotally connected about a crankpin each end of which is integral with a crankcheek.

In order to secure the connecting rod bearing cap 26 to the connecting rod bearing portion, each end of said bearing portion has a boss 28 projecting generally radially outwardly therefrom and each end of the bearing cap has a complementary boss 30 projecting generally radially outwardly therefrom. When the bearing cap 26 is disposed in position against the connecting rod bearing portion 24 each boss 28 on the connecting rod proper is disposed adjacent the complementary boss 30 on the bearing cap to form a composite boss 28, 30 at each junction of the bearing cap 26 with the connecting rod bearing portion 24. A one-piece endless ring 32 is disposed about each composite boss 28, 30 to form a tight interference fit between said ring and boss whereby said ring securely holds the bearing cap 26 in position on the connecting rod bearing portion 24.

As illustrated in Figs. 1–4 each of the bosses 28 and 30 has a semi-cylindrical shape such that when the bearing cap 26 is disposed in position each of its bosses 30 together with the complementary boss 28 on the connecting rod form a composite cylindrical projecting boss 28, 30. Also, each ring 32 has a cylindrical inner surface. In order to provide said interference fit between each ring 32 and its composite boss 28, 30 the diameter of the cylindrical inner surface of said ring, in the free condition of the ring at normal room temperatures, is made slightly smaller than the external diameter of said composite cylindrical boss 28, 30 at said temperature before a ring 32 is disposed about said boss whereby said relative dimensions provide interference against assembly of a ring 32 over a boss 28, 30. By "free condition" of a ring 32 is meant its condition when it is merely resting on a horizontal surface without any external forces acting thereon other than the force of gravity. The interference fit between each ring 32 and its boss 28, 30 may comprise a press or force fit or a shrink fit. Thus each ring 32 may be forced or pressed over each boss 28, 30 or each ring 32 may first be heated to expand the ring so that it can readily be disposed about said boss and then allowed to cool and shrink about said boss. The outer edge of each composite boss 28, 30 may be peened slightly to prevent its ring 32 from working off, for example as a result of engine vibration.

Each ring 32 preferably is made of a material whose coefficient of thermal expansion is less than or at least no greater than that of the connecting rod bearing portion 24 and cap 26 in order that the initial tension in each ring 32, after assembly about its connecting rod boss 28, 30, does not decrease as the connecting rod and its rings 32 heat up during engine operation. With each ring 32 having a smaller coefficient of thermal expansion the tension in said ring will actually increase as the connecting rod and its rings 32 heat up during engine operation. For this latter purpose the connecting rod, its bearing portion 24 and bearing cap 26 may be made of a material corresponding to Aeronautical Materials Specification No. 6412 and each ring may be made of a material corresponding to American Iron and Steel Institute Specification No. 440.

The magnitude of the clamping force holding the bearing cap 26 against the connecting rod bearing portion 24 depends on the tension in each ring 32 and said tension depends on the magnitude of the interference between each ring 32 and its composite boss 28, 30. Also, the bearing cap clamping force must be sufficiently larger than the centrifugal load on the bearing cap 26 during engine operation to hold said bearing cap tightly against the connecting rod bearing portion 24 during all engine operating conditions. Accordingly each composite boss 28, 30 and its ring 32 must be fabricated within close dimensional limits so that the magnitude of the interference between said parts can be accurately controlled. For this reason each composite boss 28, 30 and each ring 32 preferably has the circular cylindrical shape illustrated in Figs. 1–4 since this shape facilitates making said parts within close dimensional limits.

Fig. 5 illustrates a modified construction in which each bearing cap securing ring has an oval or oblong shape instead of a circular shape and the composite boss encircled by said ring has a corresponding oval or oblong shape. Except for this difference the modification of Fig. 5 is like that of Figs. 1–4 so that in Fig. 5 like parts have been designated by like reference numerals but with a subscript *a* added thereto. Preferably, and as illustrated in Fig. 5, the long dimension of each oblong-shaped ring 32*a* extends transversely across the adjacent junction of the connecting rod bearing portion and bearing cap. That is, the long dimensions of each ring 32*a* is perpendicularly to the plane of the junction of the bearing portion 24*a* and bearing cap 26*a*. This is important because the longer the ring 32*a* is, in a direction parallel to the longitudinal axis of the connecting rod, the smaller will be the effect of any discrepancy in the size of the ring on the clamping force in said direction holding the bearing cap 26*a* against the connecting rod bearing portion 24*a*. As in the case of each ring 32, each ring 32*a*, in its free condition at normal room temperatures, has an inner periphery which is slightly smaller than the periphery of a composite boss 28*a*, 30*a*, at said temperature, about which the ring is to be disposed in order to provide for an interference fit between said ring and boss. Also, as in the case of each ring 32, each ring 32*a* may be disposed in tension about its composite boss 28*a*, 30*a* by, for example, a force fit or by a shrink fit and said ring preferably has a temperature coefficient of expansion which is no greater than that of the bearing portion 24*a* and bearing cap 26*a*. As in the structure of Figs. 1–4, the outer edge of each composite boss 28*a*, 30*a* may be peened over slightly to prevent its ring 32*a* from working off.

In Figs. 1–4 each ring 32 has a circular shape. In Fig. 5 each ring 32*a* has an oval or oblong shape. Obviously, still other shaped rings could be used. Accordingly, unless otherwise specified, the word "ring" in the appended claims is intended to be broad enough to include any member shaped to form a closed loop.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. A split-bearing construction comprising first and second bearing halves each having an internal bearing surface of semi-circular cross-section; and means for securing said bearing halves together to form an internal bearing surface of circular cross-section; said means comprising a pair of projections rigid with each bearing half with the the projections of each pair being disposed, one at each end of its bearing half, adjacent to the corresponding projections on the other bearing half; and a pair of rings, one for and disposed in tension about the two adjacent projections at each junction of said bearing halves.

2. A split-bearing construction comprising first and second bearing halves each having an internal bearing surface of semi-circular cross-section; and means for securing said bearing halves together to form an internal bearing surface of circular cross-section; said means comprising a pair of projections rigid with each bearing half with the projections of each pair being disposed, one at each end of its bearing half, adjacent to the corresponding projection on the other bearing half; and a pair of endless rings, one for and disposed in tension about the two adjacent projections at each junction of said bearing halves.

3. A split-bearing construction as recited in claim 2 in which the plane of each ring is substantially perpendicular to the plane of the junction of said bearing halves.

4. A split-bearing construction as recited in claim 3 in which the coefficient of thermal expansion of each said ring is no greater than the coefficient of thermal expansion of said bearing halves.

5. A split-bearing construction as recited in claim 3 in which each of said rings has a cylindrical inner surface.

6. A split-bearing construction as recited in claim 3 in which each of said rings has an oval shape with the long dimension of said ring being disposed substantially perpendicular to the plane of the junction of said bearing halves.

7. A connecting rod structure comprising a connecting rod shank; a bearing portion formed integral with said shank and having an internal bearing surface of semi-circular cross-section; a bearing cap having an internal bearing surface of semi-circular cross-section; and means for securing said bearing cap to said bearing portion to form an internal bearing surface of circular cross-section; said means comprising a pair of bosses rigid with and projecting generally radially outwardly in opposite directions from said bearing portion, there being one such boss for and disposed adjacent to each of the two junctions of said bearing portion and bearing cap; a pair of bosses rigid with and projecting generally radially outwardly in opposite directions from said bearing cap, there being one such boss for and disposed adjacent to each of said two junctions; and a pair of endless rings, one for and disposed adjacent to each of said two junctions with each ring being disposed in tension about the adjacent bearing portion and bearing cap bosses.

8. A connecting rod structure as recited in claim 7 in which the plane of each ring is substantially perpendicular to the plane of the junction of said bearing portion and bearing cap.

9. A connecting rod structure as recited in claim 8 in which each boss on the bearing portion has a semi-cylindrical external periphery and the adjacent boss on the bearing cap has a complementary semi-cylindrical external periphery so that said two bosses form a composite cylindrical boss and in which each ring has a cylindrical inner surface.

10. A connecting rod structure as recited in claim 8 in which each boss on the bearing portion and the adjacent boss on the bearing cap form a composite oval-shaped boss having its long dimension disposed substantially perpendicular to the plane of the junction of said bearing portion and bearing cap and in which each ring has a similar oval shape.

11. A connecting rod structure as recited in claim 8 in which the coefficient of thermal expansion of each ring is no greater than that of said bearing portion and bearing cap.

12. A connecting rod structure comprising a connecting rod shank; a bearing portion formed integral with said shank and having an internal bearing surface of semi-circular cross-section; a bearing cap having an internal bearing surface of semi-circular cross-section; and means for securing said bearing cap to said bearing portion to form an internal bearing surface of circular cross-section; said means comprising a pair of bosses rigid with and projecting generally radially outwardly in opposite directions from said bearing portion, there being one such boss for and disposed adjacent to each of the two junctions of said bearing portion and bearing cap with each said boss having a semi-cylindrical external periphery; a pair of bosses rigid with and projecting generally radially outwardly in opposite directions from said bearing cap, there being one such boss for and disposed adjacent to each of said two junctions with each said boss having a semi-cylindrical external periphery such that when the bearing cap is secured in position on the bearing portion the pair of bearing cap and bearing portion bosses at each said junction form a composite boss having an external cylindrical surface whose axis is co-axial with the composite boss at the other said junction and is perpendicular to the axis of the circular bearing surface formed by the bearing portion and bearing cap; and a pair of endless rings having a cylindrical inner surface, there being one such ring for each said composite boss with each ring disposed in tension about its composite boss.

13. A connecting rod structure as recited in claim 12 in which the coefficient of thermal expansion of each ring is less than that of its composite boss.

References Cited in the file of this patent

UNITED STATES PATENTS

| | | |
|---|---|---|
| 116,542 | Blake | July 4, 1871 |
| 1,250,525 | Sunderland | Dec. 18, 1917 |
| 1,332,888 | Corson | Mar. 9, 1920 |
| 2,239,834 | Williams | Apr. 29, 1941 |